Patented May 24, 1949

2,470,784

UNITED STATES PATENT OFFICE 2,470,784

GAMMA IRON OXIDE-ALKALI METAL FERRATE AND PROCESS OF PREPARATION

Max A. Mosesman, Baytown, Tex., assignor, by mesne assignments, to Standard Oil Development Company, Elizabeth, N. J., a corporation of Delaware No Drawing. Original application December 20, 1946, Serial No. 717,582, now Patent No. 2,455,696. Divided and this application June 23, 1948, Serial No. 34,843

10 Claims. (Cl. 252—474)

This invention is directed to a method for preparing a composition adapted to be used as a catalyst. More particularly, this invention relates to a method for preparing a promoted catalyst for utilization in the hydrogenation of carbon oxides.

This application is a division of U. S. Serial No. 717,582, filed December 20, 1946 (now Patent No. 2,455,696).

It is well known to the art to synthesize hydrocarbons and oxygenated derivatives of hydrocarbons by passing a mixture of carbon monoxide and hydrogen over a suitable catalyst at elevated temperatures and pressures. This reaction is commonly designated as the Fischer-Tropsch synthesis and is usually carried out at temperatures in the range of about 450° to 675° F. and pressures in the range of 100 to 500 pounds per square inch. Such reactions have customarily been carried out in the presence of catalysts comprising the oxides of metals in group VIII of the periodic table such as the oxides of iron, cobalt, and nickel. It is also known to use such oxides as catalysts either alone or supported on an inert material such as alumina, kieselguhr, and other such supporting agents. It has also been known to add to the active catalytic material in the catalyst composition a substance usually designated as a promoter which exerts a specific effect on the catalyst activity, selectivity of the reactants to useful products, and on the active life of the catalyst. Catalysts containing promoters in substantially small quantities often permit consistently high conversion of the reactants to desired products over much longer periods of operation than is possible when using an unpromoted catalyst.

It is the object of the invention to provide a method for preparing an improved catalyst. Another object of the present invention is to devise a method for preparing a catalyst particularly adapted for use in the Fischer-Tropsch synthesis. A further object of this invention is to prepare a catalyst that may be utilized in the synthesis of high yields of useful products by the hydrogenation of carbon oxides during long periods of operation.

The present invention may be described briefly as involving the preparation of a catalyst comprising a major portion of iron or an iron oxide as the active catalytic material and a minor portion of an alkali metal ferrate such as potassium ferrate ($K_2FeO_4$) as the promoting material. The method of preparation comprises the steps of forming an alkali metal ferrate by adding to a mixture of $Fe(OH)_3$ and an alkali metal hydroxide an oxidizing agent such as bromine, adding the thus formed alkali metal ferrate to the iron or iron oxide catalyst, intimately mixing the two, drying and pilling the mixture, and heating the mixture at an elevated temperature of about 1000° F. in the presence of air to obtain the finished catalyst. Following the heat treatment in the presence of air, the catalyst is then reduced at a temperature in the range between 700° and 1600° F.

The alkali metal ferrate promoter, for example, potassium ferrate, to be added to the catalyst may be prepared in a number of ways. In the preferred procedure, $Fe(NO_3)_3.9H_2O$ is reacted with ammonium hydroxide to cause the precipitation of $Fe(OH)_3$ and the ferric hydroxide thus formed is filtered and then slurried with water. The water slurry is admixed with solid KOH and to the mixture is added slowly liquid bromine and solid KOH until the mixture is saturated with respect to the latter. The reaction mixture should be kept at a temperature below about 140° F. The mixture may then be heated carefully with stirring for about one-half hour at about 140° F., allowed to cool, and the top layer removed from the reaction mixture. The top layer is dried in a vacuum and then washed with alcohol until substantially free of alkali. The alcohol-washed material is also dried in a vacuum to produce a potassium ferrate substantially free from contaminating substances.

The purified potassium ferrate is then added to a powdered iron or to powdered oxide of iron such as ferro-ferric oxide or alpha and gamma ferric oxides. It is usually desired that sufficient potassium ferrate be added to the active catalytic material such that the finished catalyst will comprise about 0.2 to 20 weight per cent potassium ferrate based on the iron or iron oxide employed.

The mixture of potassium ferrate and iron or iron oxide is milled, preferably in the presence of a small amount of alcohol, dried at a temperature of about 230° F. and pilled. The pilled material is then heated at superatmospheric temperatures in the presence of air to obtain an active catalyst containing promoting quantities of potassium ferrate.

The presence of both potassium bromide and potassium bromate in small amounts in the finished catalyst is not objectionable since both of these substances may have a tendency to promote the activity of the iron oxide catalyst in the hydrocarbon synthesis reaction.

The practice of the present invention will be further illustrated by the following examples:

To an aqueous solution containing 340 parts by weight of $Fe(NO_3)_3 \cdot 9H_2O$ is added 90 parts by weight of $NH_4OH$. The precipitated $Fe(OH)_3$ is filtered dry and then slurried with about 100 parts by weight of distilled water. To the slurry is added 50 parts by weight of solid KOH and while the suspension is maintained at a temperature below 140° F., 50 parts by weight of liquid bromine and solid KOH are added. During this addition, the materials are added gradually with continual stirring. Sufficient solid KOH is added to the reaction mixture so that the latter is completely saturated with respect to alkali. At this point, it is preferable to add an excess of solid KOH to the mixture, for example, 20 parts by weight of excess alkali, before heating the mixture with stirring at a temperature of 140° F. for approximately one-half hour.

The heated mixture is allowed to cool and the top layer comprising potassium ferrate is decanted from the total mixture and dried under partial vacuum. Alkaline material remaining in the dried potassium ferrate may be removed by successive washings and decantations with alcohol. The potassium ferrate is then redried under vacuum and, as produced in this manner, is substantially free from alkaline contaminants and contains minor portions of potassium bromide or potassium bromate as illustrated by the following analysis:

| | Percent |
|---|---|
| $K_2FeO_4$ | 75.0 |
| KBr | 20.0 |
| $KBrO_3$ | 5.0 |

To 100 parts by weight of ferro-ferric oxide in finely divided form is added 5 parts by weight of dried potassium ferrate and a small amount of alcohol to permit adequate milling. The mixture is then mixed thoroughly for about 4 hours by ball milling, dried at about 230° F. and pilled to a size desired for subsequent use in the synthesis process. The pilled material is then heated in free excess air at about 1000° F. for about 4 hours and allowed to cool.

The beneficial results to be obtained by using the above-prepared catalyst, containing 5 parts by weight of potassium ferrate per 100 parts by weight of ferro-ferric oxide in the hydrogenation of carbon monoxide is exemplified by the following data:

The catalyst prepared in accordance with the above procedure is placed in a reaction chamber and reduced in the presence of hydrogen for 24 hours at a temperature of 700° F. and atmospheric pressure. The hydrogen is passed over the catalyst at a rate of 1000 volumes of hydrogen per volume of catalyst per hour. A synthesis gas mixture comprising one part of hydrogen per part of carbon monoxide is then passed over the catalyst at a pressure of 150 pounds per square inch gauge, a temperature of 575° F., and a rate of 200 volumes per volume of catalyst per hour.

This catalyst was employed in the synthesis of hydrocarbons from carbon monoxide and hydrogen for 1736 hours. Samples of the products were examined during each 24 hour period. During the first 508 hours the CO conversion in mole per cent declined from an initial figure of 97.9 to 91% while the selectivity ratio of $C_4$ and heavier hydrocarbons produced to total product in mole per cent increased from an initial figure of 64% to as much as 78% and after 508 hours operation was 73.1%. During this period of time, the yield of $C_4{}^+$ hydrocarbons in cc. per cubic meter of hydrogen and carbon monoxide consumed varied within a wide range from 135 at the outset to as high as 250 after 220 hours, 257 after 244 hours, and had only declined to 185 in the interim between 484 and 508 hours.

The amount of water produced during this period as cc. per cubic meter of hydrogen and carbon monoxide consumed also varied widely ranging from about 12 to about 60 and averaging between 36 and 48. During all this time of operation, the test data on the hydrocarbons produced in the process showed the presence of a considerable amount of alpha olefins. The presence of alpha olefins is considered to be very beneficial in that the alpha olefins are valuable feed stocks for polymerization to high molecular weight polymers useful as lubricating oils. The ratio of alpha to beta olefins produced during the first 508 hours of operation ranged from about 4.6 to as high as 4.7 and the sample obtained just previous to the end of the first 508 hour period showed an alpha olefin to beta olefin ratio of 4.3

Up to 998 hours operation the carbon monoxide conversion in mole per cent slowly declined from 91 to 82.5 while the selectivity ratio of $C_4{}^+$ hydrocarbons to total product in mole per cent remained fairly constant, the data showing a 74.6% selectivity after 998 hours operation with the improved catalyst of the present invention. The yield of $C_4{}^+$ hydrocarbons in cc. per cubic meter of hydrogen and carbon monoxide consumed after 508 hours was 185 and after 998 hours was still 185; some fluctuation of yields during this period was observed with as much as 228 cc. of $C_4{}^+$ hydrocarbons being produced per cubic meter of hydrogen and carbon monoxide consumed with the greater amount of the data showing the production to vary between 170 and 190 cc. The amount of water produced during this period of time was in the range from about 24 to 42 cc. per cubic meter consumption of hydrogen and carbon monoxide. The ratio of alpha to beta olefins declined slightly during the period to below 3.3.

The improved catalyst of the present invention was continued in use with a slight decline in activity and selectivity until after 1088 hours the catalyst was reduced with hydrogen at 700° F. for 24 hours at 1000 v./v./hr. and at atmospheric pressure. After this treatment, the catalyst was again used in the synthesis of hydrocarbons from hydrogen and carbon monoxide for a total of 1736 hours.

After the treatment subsequent to 1088 hours employment as catalyst the mole per cent carbon monoxide conversion was raised to 99.4 while the selectivity ratio of $C_4{}^+$ hydrocarbons to total product was 70.7%. The yield of $C_4{}^+$ hydrocarbons after the foregoing treatment showed only 149 cc. per cubic meter of hydrogen and carbon monoxide but increased within the next 24 hour period to 203 then in a second 24 hour period to 262 and remained in the neighborhood of 200 and higher until 1256 hours total operation had ensued. The carbon monoxide conversion declined from 94 mole per cent after 1256 hours to 90.1 after 1424 hours and to 89.8 after 1472 hours. After the catalyst had been used for a total of 1520 hours, it was then given a similar reduction treatment as that employed after 1088 hours. This second treatment, however, was not as beneficial as the first, and it was necessary to terminate the run after 1736 hours.

As mentioned before, the temperature employed in the outset was 575° F. at a pressure of 150 pounds and a feed rate of 200 v./v./hr. This temperature was raised after 628 hours of operation to 585° F. and in the period between 700 hours until the end of the run was maintained at 600° F.

While the foregoing run was terminated after 1736 hours, it is believed that the improved catalyst could have been used for even longer periods since, subsequent to the run termination, the synthesis gas feed to the reactor was found to contain 17 P. P. M. of sulfur as H₂S. More than 5 P. P. M. of sulfur has been found to poison the activity of the catalyst in synthesizing hydrocarbons.

It will be apparent from the foregoing data that the improved catalyst of the present invention may be used for periods up to 1000 hours and higher while yet obtaining substantial conversion, selectivity, and yield of $C_4$ and higher hydrocarbons. While not mentioned in the foregoing description of the run, the amount of oxygenated material in the hydrocarbons produced was maintained at a low figure throughout the run.

In contrast to the above run, an unpromoted ferro-ferric oxide catalyst oxidized in the presence of air and subsequently reduced under atmospheric conditions described above was employed under similar run conditions. The selectivities and yields of useful products were considerably lower for the unpromoted catalyst than were obtained in the case of the promoted catalyst. For example, the unpromoted catalyst permitted the production of only 100 cc. of $C_4$ and heavier products per cubic meter of hydrogen and carbon monoxide consumed. Furthermore, the unpromoted catalyst possessed a very short life and after only 100 hours of operation the yields of useful products were reduced to 60 cc. of $C_4^+$ per cubic meter of hydrogen and carbon monoxide consumed requiring termination of the run.

In another example, 340 parts of $Fe(NO_3)_3.9H_2O$ was dissolved in distilled $H_2O$. A dilute solution of $NH_4OH$ was added to the solution to precipitate $Fe(OH)_3$. This was filtered and to the filtrate a solution of 50 parts of solid KOH dissolved in distilled water was added. The mixture was stirred to a smooth paste while controlling the temperature. To the cooled material 50 parts of bromine was added below the surface of the solution while stirring vigorously. Solid KOH was then added in small quantities until saturation was obtained with the KOH being added to excess. During the addition of the KOH the temperature was maintained no higher than 41° C. and at approximately 25° C. The solution was then carefully heated to 60° C. for one-half hour, heat removed and the solution cooled. After approximately 24 hours, the upper half of the material, hereafter referred to as the upper layer, was removed. The upper layer and the bottom half, referred to as the lower layer, was then evaporated under vacuum at a temperature of 47° C. for two weeks. After this period both the upper layer and the lower layer were removed from the heat treating operation and washed free of KOH by repeated separate washings with 95% ethyl alcohol. The washed samples were filtered and dried under a vacuum. The upper layer was analyzed as follows:

| | Per cent |
|---|---|
| $Fe_2O_3$ | 62.5 |
| $K_2FeO_4$ | 37.5 |

A weighed amount of material having the above composition was then suspended in 95% ethyl alcohol to which was added a weighed amount of ferro-ferric oxide which was thoroughly mixed by stirring to form a smooth slurry. The slurry was dried in an oven at 95° C. with air circulating freely for a period of 48 hours. The temperature was then raised to about 110° C. and maintained, with the exception of a 12 hour period when the temperature rose to about 160° C., for three weeks. The dried material was pilled into ⅛ inch pills which were heated for 4½ hours in the presence of an oxygen-containing atmosphere at 1000° F. following which the material was allowed to cool in air to atmospheric temperature. The catalyst prepared in the foregoing manner comprises 2% by weight of $K_2FeO_4$ and 98% iron oxide and was then employed for the synthesis of hydrocarbons from carbon monoxide and hydrogen after being reduced in the presence of hydrogen for 24 hours at a temperature of 700° F. and at atmospheric pressure. During the reduction treatment the hydrogen was passed over the catalyst at the rate of 1000 volumes of hydrogen per volume of catalyst per hour. A synthesis gas mixture comprising one part of hydrogen per part of carbon monoxide was employed as the feed stock, the conditions of operation being 150 pounds pressure, a temperature of 575° F., and a feed rate of 200 volumes of feed per volume of catalyst per hour.

In the synthesis of hydrocarbons in the foregoing manner using the catalyst, it was found that effective yields of $C_4$ and heavier hydrocarbons could be obtained, with the improved method of obtaining the catalysts, for over 600 hours. During certain periods of the operation as much as 307 cc. of $C_4$ and heavier hydrocarbons per cubic meter of feed consumed were obtained. During longer periods, $C_4$ and heavier hydrocarbon yields ranging from approximately 150 cc. to 237 cc. per cubic meter of feed stock consumed were obtained.

It is seen, therefore, that the catalyst composition produced in accordance with my process is greatly superior to a catalyst which has not been promoted with potassium ferrate.

While examples of temperature and pressure conditions suitable for use in the practice of the present invention have been given to illustrate its advantages, it will be obvious to workers skilled in the art that temperatures and pressures over a substantial range may be employed and good results obtained. It will also be obvious that the promoting material admixed with the iron or iron oxide catalyst may be present over a substantial range and satisfactory results obtained. It is not intended that the above-cited examples limit the scope of my invention.

The practice of the invention has been illustrated by the employment of potassium ferrate as the alkali metal ferrate in preparing the catalyst. It is within the scope of the invention to use other alkali metals than potassium in preparing the catalyst adapted for use in the Fischer-Tropsch synthesis. For example, sodium and lithium ferrate may be used in lieu of the potassium ferrate. Potassium ferrate, sodium ferrate, and lithium ferrate may be used, preferably in the order given, in preparing the catalyst. The lithium ferrate will be less desirable to employ than the sodium and potassium ferrate but under some circumstances it may be desirable to use it.

Having fully described and illustrated the practice of the present invention, what I wish to claim as new and useful and to secure by Letters Patent is:

1. A method for preparing a catalyst adapted for use in a Fischer-Tropsch synthesis which consists of the steps of preparing an admixture of gamma iron oxide and alkali metal ferrate in an amount in the range between 0.2 and 20% by weight of said gamma iron oxide, heating said admixture at a superatmospheric temperature of about 1000° F. for about 4 hours in the presence of an oxidizing atmosphere, and subsequently contacting the admixture with a reducing atmosphere at a superatmospheric temperature in the range between 700° and 1600° F. for about 24 hours.

2. A method of producing a catalyst suitable for use in the Fischer-Tropsch synthesis which consists of the steps of forming an alkali metal ferrate substantially free from contaminating materials, admixing the alkali metal ferrate with gamma iron oxide in an amount sufficient to form an admixture containing between 0.2 and 20% by weight of alkali metal ferrate based on the gamma iron oxide, heating the admixture in the presence of an oxidizing atmosphere at a superatmospheric temperature of about 1000° F. for about 4 hours and subsequently reducing the heated mass in a reducing atmosphere at a superatmospheric temperature of about 700° F. for about 24 hours.

3. A method in accordance with claim 2 in which the alkali metal ferrate is potassium ferrate.

4. A method in accordance with claim 2 in which the alkali metal ferrate is sodium ferrate.

5. A method in accordance with claim 2 in which the alkali metal ferrate is lithium ferrate.

6. A composition adapted for use as a catalyst in the production of hydrocarbons and oxygenated hydrocarbons which consists of a mixture of gamma iron oxide in an amount in the range between 80% and 99.8% by weight and an alkali metal ferrate in an amount in the range between 0.2 and 20% by weight which mixture has been contacted with an oxidizing atmosphere at a temperature of about 1000° F. for about 4 hours and then with a reducing atmosphere at a temperature in the range between 700° and 1600° F. for about 24 hours.

7. A composition in accordance with claim 6 in which the alkali metal ferrate is potassium ferrate.

8. A composition in accordance with claim 6 in which the alkali metal ferrate is lithium ferrate.

9. A composition in accordance with claim 6 in which the alkali metal ferrate is sodium ferrate.

10. A composition adapted for use as a catalyst in the production of hydrocarbons and oxygenated hydrocarbons which consists of a mixture of approximately 95% by weight of gamma iron oxide and approximately 5% by weight of potassium ferrate which mixture has been heated in the presence of air at a temperature of the order of 1000° F. for about 4 hours and then heated in the presence of hydrogen at a temperature of about 700° F. for about 24 hours.

MAX A. MOSESMAN.

No references cited.